United States Patent
Reynolds

(10) Patent No.: US 9,398,757 B2
(45) Date of Patent: Jul. 26, 2016

(54) LABORATORY ANIMAL STIMULATORY ENRICHMENT PRODUCT

(71) Applicant: The Andersons, Inc., Maumee, OH (US)

(72) Inventor: Jerel G. Reynolds, Leawood, KS (US)

(73) Assignee: The Andersons, Inc., Maumee, OH (US)

( * ) Notice: Subject to any disclaimer, the term of this patent is extended or adjusted under 35 U.S.C. 154(b) by 95 days.

(21) Appl. No.: 14/381,939

(22) PCT Filed: Feb. 28, 2013

(86) PCT No.: PCT/US2013/028337
§ 371 (c)(1),
(2) Date: Aug. 28, 2014

(87) PCT Pub. No.: WO2013/130817
PCT Pub. Date: Sep. 6, 2013

(65) Prior Publication Data
US 2015/0013615 A1 Jan. 15, 2015

Related U.S. Application Data

(60) Provisional application No. 61/604,472, filed on Feb. 28, 2012.

(51) Int. Cl.
*A01K 29/00* (2006.01)
*A01K 15/02* (2006.01)
*A01K 1/015* (2006.01)

(52) U.S. Cl.
CPC ............. *A01K 15/025* (2013.01); *A01K 1/0152* (2013.01); *A01K 1/0155* (2013.01)

(58) Field of Classification Search
CPC .... A01K 15/026; A01K 15/025; A23K 1/003
USPC .................................. 119/709, 710, 174, 707
See application file for complete search history.

(56) References Cited

U.S. PATENT DOCUMENTS 1,022,113 A * 4/1912 Smith .................. A01K 15/025
119/711
2,708,418 A 5/1955 Sugarman et al.
(Continued)

FOREIGN PATENT DOCUMENTS

WO 2013019916 A2 2/2013

OTHER PUBLICATIONS

Harry N. Shair, PhD., Yasmin Nunez, Mohamed M. Osman, DVM, PhD. "Enrichment Materials Do Not Negatively Affect Reproductive Success and Offspring Survival and Weight in Mice", Division of Developmental Neuroscience, New York State Psychiatric Institute, NY, NY; School of Health and Natural Sciences, Mercy College, Dobbs Ferry, NY; Division of Comparative Medicine, New York State Psychiatric Institute, NY,NY, Correspondence should be addressed to H.N.S. (hnsl@columbia.edu); vol. 12, No. 2, Feb. 2012; www.labanimal.eu, pp. 10-19.

(Continued)

*Primary Examiner* — Yvonne Abbott-Lewis
(74) *Attorney, Agent, or Firm* — Avery N. Goldstein; Blue Filament Law PLLC

(57) ABSTRACT

A puck formed from compressed paper strips is provided that has utility as an animal entertainment device and nest building material. The paper strips include at least one ply of fibrous material, and may be treated with adjuvants illustratively including flavorants, fragrances, dyes, and odor suppressants. The unfolding and deconstruction of the puck into constituent paper strips by an animal provides the animal with a degree of mental stimulation and nest construction for thermal regulation, and it is noted that animal food consumption and health are generally improved by alleviating behaviors associated with cage confinement. The pre-measured quantum of material in an inventive puck affords a benefit to the caregiver in that the product is simply placed in the cage without resort to measuring and thereby saving time and precluding spillage of separated materials. The puck is particularly beneficial to rodents and especially mice.

69 Claims, 2 Drawing Sheets

(56) References Cited

U.S. PATENT DOCUMENTS

| | | | |
|---|---|---|---|
| 3,828,731 A | 8/1974 | White | |
| 4,376,422 A | 3/1983 | Whitehead et al. | |
| 4,802,444 A | 2/1989 | Markham et al. | |
| 5,224,959 A | 7/1993 | Kasper | |
| 5,630,377 A | 5/1997 | Kumlin | |
| 5,947,061 A | 9/1999 | Markham et al. | |
| 5,964,188 A | 10/1999 | Hetman | |
| 6,148,768 A | 11/2000 | Ochi et al. | |
| 6,325,022 B1 * | 12/2001 | LaFeber, III | A01K 1/03 119/708 |
| 6,448,307 B1 | 9/2002 | Medoff et al. | |
| 6,619,233 B1 | 9/2003 | Mochizuki | |
| 7,066,110 B2 | 6/2006 | Mochizuki | |
| 7,387,085 B2 | 6/2008 | Ikegami et al. | |
| 2009/0038554 A1 | 2/2009 | Tsutsumi et al. | |
| 2009/0095231 A1 | 4/2009 | Axelrod et al. | |
| 2009/0114167 A1 * | 5/2009 | Axelrod | A01K 15/026 119/710 |
| 2009/0277397 A1 | 11/2009 | Hass | |
| 2012/0137982 A1 | 6/2012 | Skulan | |
| 2015/0013616 A1 * | 1/2015 | Tsengas | A01K 15/025 119/711 |
| 2015/0164047 A1 * | 6/2015 | Watts | A23K 1/004 426/92 |

OTHER PUBLICATIONS

Andrea Gay "Nesting & Thermoregulation", The Andersons Bedding Products; www.andersonslabbedding.com/2011/08/nesting_thermoregulation.pdf; The Enrichment Record, vol. 9, Oct. 2011. 3 pages.

* cited by examiner

LABORATORY ANIMAL STIMULATORY ENRICHMENT PRODUCT

CROSS-REFERENCE TO RELATED APPLICATION

This application claims priority of U.S. Provisional Patent Application Ser. No. 61/604,472 filed Feb. 28, 2012, which is incorporated herein by reference.

FIELD OF THE INVENTION

The present invention in general relates to animal products, and in particular to a puck formed from compressed paper strips, the unfolding of which providing an animal with a degree of mental stimulation, and nest building material for thermoregulation.

BACKGROUND OF THE INVENTION

There is a growing body of evidence that domesticated animals and in particular laboratory animals exhibit behaviors that in humans are associated with sensory deprivation, and depression. These abnormal behaviors not only impact the well-being of an individual animal but also have implications in studies involving such an animal owing to the physiological effects of sensory deprivation and depression. In humans, sensory deprivation and depression have an effect on metabolism, cognitive function, immune response and other parameters relevant to clinical studies. The ability to provide a laboratory animal with a degree of mental stimulation is hampered by the requirements of study protocols that attempt to avoid introduction of new reaction variables, as well as the requirement in many instances that only sterilized materials be brought into contact with a laboratory animal. Captive animals deserve an environment which is rich in social opportunity, mental stimulation, and physical challenges. Sterility conditions are typically enforced in instances where an animal has been immunocompromised or otherwise carries a genetic defect rendering an animal vulnerable to disease or infection.

With laboratory study requirements, litter provided to absorb animal urine and desiccate fecal material is one of a limited number of opportunities to provide a source of stimulation to a confined laboratory animal. Prior art attempts have been made to include folded squares of paper with the intention that the animal would occupy time delaminating and chewing or unfolding the small chips of paper. Unfortunately, such attempts met with limited success owing to the disinterest of mice (especially male species) and rats confined within laboratory cages to actually play with the folded squares of paper. The 1985 amendments to the Animal Welfare Act included provisions for the promotion of the psychological well-being of nonhuman primates and for exercise for dogs. Today, many research, teaching and testing facilities have established environmental enrichment programs for all animal species. (awic.nal.usda.gov/nal_display/index) are representative of this effort.

Nest building is natural activity of rodents, especially mice. Nest building is a form of psychological enrichment and a vital part of needs for a mouse environment. Mice tend to be most comfortable at a temperature of 30 degrees Celsius. Often laboratories housing mice are maintained at a temperature of 21 to 24 degrees Celsius. Mice build nests in order to thermoregulate. Through the maintenance of mice at a comfortable temperature, mice consume less food, have higher pup yields, and experience less overall stress.

Thus, there exists a need for an animal litter product that engages the attention of a laboratory animal to occupy time and alleviate some of the symptoms associated with sensory deprivation and thermal disregulation. There further exists a need for such a litter capable of being sterilized and still functioning as an effective animal litter product.

SUMMARY OF THE INVENTION

A puck formed from compressed paper strips is provided that has utility as an animal entertainment device and nest building material. The paper strips include at least one ply of fibrous material, and may be treated with adjuvants illustratively including flavorants, fragrances, dyes, and odor suppressants. The unfolding and deconstruction of the puck into constituent paper strips by an animal provides the animal with a degree of mental stimulation and nest construction for thermal regulation, and it is noted that animal food consumption and health are generally improved by alleviating behaviors associated with cage confinement. The pre-measured quantum of material in an inventive puck affords a benefit to the caregiver in that the product is simply placed in the cage without resort to measuring and thereby saving time and precluding spillage of separated materials. The present invention is particularly beneficial to rodents and especially mice.

DESCRIPTION OF THE INVENTION

The present invention has utility as an animal entertainment device and nest building material in the form of a puck formed from compressed paper strips, the unfolding of which providing an animal with a degree of mental stimulation and nest construction. It has been surprisingly found that a compressed mass according to the present invention provides multiple benefits to the animal including mental stimulation and activity generation, nesting material, and also improved regulation. Additionally, the pre-measured quantum of material in an inventive product affords a benefit to the caregiver in that the product is simply placed in the cage without resort to measuring and thereby saving time and precluding spillage of separated materials. With the animal occupied and thermally regulated, it is noted that animal food consumption and health are generally improved. The present invention is particularly beneficial to rodents and especially mice.

The deconstruction of the puck by an animal into constituent paper strips provides the animal with an activity that occupies time and appears to alleviate behaviors associated with cage confinement. The resultant decompressed strips are routinely fashioned into nesting material by animals. In addition, the animal is able to push or carry the puck to different areas of the cage. In an instance where more than one puck is introduced to the animal's environment, the animal can collect the pucks or distribute the pucks around their cage.

As used herein, the term "paper strip" is defined to include at least one ply of fibrous material. The fibrous material illustratively includes cellulose, alkoxylated cellulose, alginate, starch, polyethylene, polypropylene, polyvinyl, polystyrene, Spandex, Lycra, rubber, fleece, cellulose pulp, cellulose pulp derivatives, or any combinations thereof. The paper strips being planar, crinkled, twisted, rolls, and combinations thereof.

As used herein, an "animal" is defined to include a rodent such as a mouse, rat, hamster, gerbil, and rabbit; a bird such as a quail, chicken, turkey, parrot, parakeet, canary, and finch: felines, such as domesticated cats; and a primate such as a monkey, chimpanzee, and gorilla.

Figure 1:
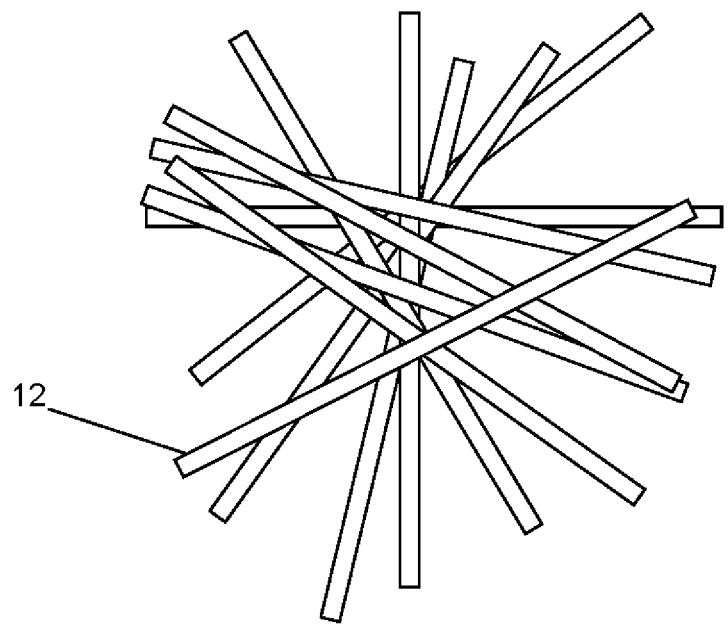
FIG. 1 is a perspective view of paper strips used in forming a puck of the present invention.
Figure 2:
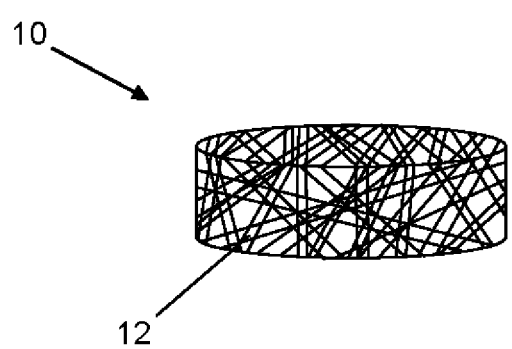
FIG. 2 is a perspective view a puck formed from compressed paper strips of FIG. 1 according to an embodiment invention.

FIG. 1 illustrates a group or pile of paper strips 12 that are compressed to form the puck as depicted in FIG. 2 at 10. The paper strips 12 may have a height to length ratio from 1:1 to 1:200; and in still other embodiments from 1:5 to 1:50 with the understanding that other height to length ratios depending on the overall dimensions of the puck are operative herein. It is appreciated that the term "puck" includes shapes other than right cylinders and also include rectilinear forms, spheroids, polygonal forms, and geometrically irregular forms. The puck can have smooth or frayed edges. The thickness of the paper strips 12 may typically be between 0.07 millimeters (0.0028 in) and 0.18 millimeters (0.0071 in). It is also appreciated that according to the present invention, depending on the size of the animal, the thickness of the paper strip 12 is increased beyond these values.

The paper strips 12 are in certain embodiments amenable to sterilization for use in conjunction with immuno-compromised or genetically mutated laboratory animal models for disease. The sterilization techniques operative with the paper strip component of an inventive puck 10 illustratively include gamma radiation and thermal sterilization techniques such as those involving superheated steam or heated air.

The paper strip 12 component of an inventive puck 10 is amenable to incorporation of various adjuvants operative to enhance performance and/or entertainment value of the puck 12. Adjuvants suitably incorporated into the paper strip 12 component of an inventive puck 12 illustratively include fragrances; dyes; odor suppressants such as baking soda; superabsorbent polymer granules; flavorants such as sugar and fruit flavors; and nutrients. In the instance where a paper strip 12 component includes entertainment value enhancing adjuvants such as dyes or flavorants, it is appreciated that the stimulation value is enhanced by irregular distribution of the adjuvant. Irregular distribution is readily achieved by exposing the pile of paper strips 12 used to form the pucks 10 for an amount of time sufficient to create an incomplete penetration of the adjuvant into the paper strips 12. It is appreciated that an adjuvant is readily applied in the form of a solid, liquid, or solution with excess moisture being removed to arrive at a paper strip 12 component moisture component with a preselected level.

The puck 10 is formed by compressing a pile of paper strips 12 in a mold. As shown in FIG. 1, the pile of paper strips 12 is composed of a random stack of paper strips 12, which when compressed form the puck 10 resulting in a mass of randomly oriented and intertwined paper strips 12. To aid in the forming and retention of the puck shape during and after the release from the mold, the paper strips 12 may be wetted with water or other alternative liquids.

In an embodiment, the puck 10 according to the present invention has a mean height between 25.4 millimeters (0.1 in) and 254 millimeters (1.0 in). The diameter of the puck may very, for example between 127 millimeters (0.5 in) and 508 millimeters (2.0 in), with a typical ratio between diameter and height of between 2:1 and 30:1. It is appreciated that the mean height and diameter of the puck is chosen with recognition as to the size and dexterity of the animal using the inventive puck. For example, much larger dimensions would be required for a puck for use with a primate.

An animal, when provided with the present inventive puck, engages an activity to reduce boredom, anxiety, and stress; as well experiencing enhanced mental stimulation. An animal is also noted to have better thermal regulation upon deconstruction of a puck 10 into constituent strips 12 and therefore have lower overall food consumption. The activity involves relocation of one or more supplied of the inventive puck 10 and systematic turning and unfolding of the pucks 10 to yield individual paper strips 12. Typically, an animal moves one or more pucks 10 from one location within the cage to another.

An animal exposed to an inventive puck, in particular a rodent, is observed to initially begin chewing an inventive puck. Upon the animal discovering that the puck begins to unravel into strips of paper, animal handling and chewing of a puck becomes purposeful with the intent of rendering a puck as a collection of paper strips. The strips formed from unfolding the one or more pucks are then taken by the animal to be used to form a hiding place as well as bedding. The paper strips obtained from the inventive puck replaces manufactured rigid hiding places with a more instinctively sought and natural material to the animal.

Figure 3:
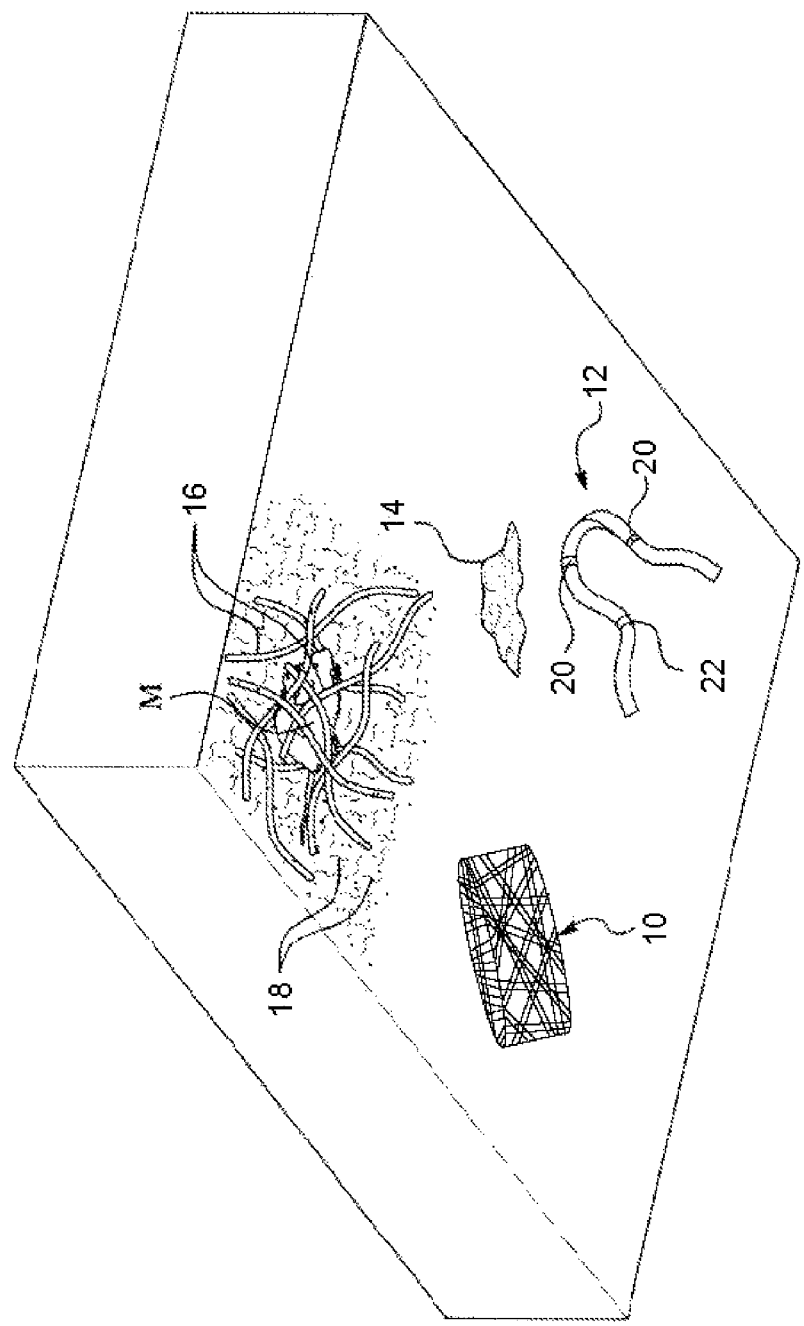
FIG. 3 is a perspective representation of laboratory animal manipulation of the inventive puck.

As shown with reference to FIG. 3, the inventive puck 10 as provided to an animal contains paper strip component 12. An animal, a mouse M as depicted in FIG. 3, begins to interact with the inventive puck 10. The animal M chews puck 10 to produce a macerated polymeric mass 14. Typically the animal M begins to unravel pucks to form partially unraveled paper strips 16 from the puck 10, and eventually succeeds in creating only unraveled paper strips 12. The strips 12, partially unraveled puck 10 and macerated mass 14 in varying amounts are formed as a shelter 16 and/or a bedding mass 18. A surprising aspect of the present invention is that male rodents, which are more likely to exhibit abhorrent and antisocial behavior, are also observed to engage in apparent play behavior with the paper strips 12 of an inventive puck 10. The periodic inclusion of flavorant patches 20 and to a lesser extent colorimetric zones 22 along the length of a paper strip 12 is noted to enhance animal interest in the inventive puck.

The present invention is further illustrated through resort to the following non-limiting examples. These examples are not intended to limit the scope of the appended claims.

EXAMPLES

Example 1

A Cage with Animal Litter for a Base Material Versus a Cage with Animal Litter and an Inventive Puck A total of ten separate cages with five of the cages configured with only animal litter, and the other five cages configured with litter and an inventive puck. All cages are structurally identical and kept in isolation. To each cage, a male mouse with comparable weight, age, and physiological conditions is placed.

The following experimental parameters are examined: the first play period before the first resting observed; the length of the first resting segment; the second play period between the first two resting segments; and the length of the second resting segment. Table 1 illustrates the results of the experiment. The term "play period" refers to a period of time in minutes during which a rodent is relatively continuously touching, kicking, rolling, and dissecting the puck. The term "resting segment" refers to a period of time during which a rodent is in an idling position such as lying down, sitting, or merely walking Each time period is presented as an average of five independent readings. Table 1 shows the relevant results with regard to this experiment.

TABLE 1

|  | Average for Comparative Group | Average for Inventive Group |
|---|---|---|
| First period | 7 minutes | 12 minutes |
| First resting segment | 6 minutes | 5 minutes |
| Second play period | 5 minutes | 13 minutes |
| Second resting segment | 9 minutes | 7 minutes |

The substantial prolongation in playing times associated with the inventive puck is due to the following factors. The rodents in the inventive group first spend a portion of time in moving the puck in the cage. After the relocation of the puck is done, the rodent starts peeling and unfolding the paper strips in the puck to form bedding or a nest. Rodents in the comparative group lack the stimulation provided by the puck.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. An animal product, said product comprising:
a plurality of paper strips, said plurality of paper strips having a height to length ratio from about 1:1 to about 1:200;
a puck formed from the compression of said plurality of paper strips in a mold; and
wherein said puck induces extended play time in a laboratory animal by providing the animal the opportunity to relocate and disassemble said puck into said plurality of paper strips.

2. The animal product of claim 1 wherein said plurality of paper strips comprise at least one ply of fibrous material.

3. The animal product of claim 2 wherein said fibrous material includes cellulose, alkoxylated cellulose, alginate, starch, polyethylene, polypropylene, polyvinyl, polystyrene, Spandex, Lycra, rubber, fleece, cellulose pulp, cellulose derivatives, or any combinations thereof.

4. The animal product of claim 1 wherein said plurality of paper strips have a thickness between 0.07 millimeters (0.0028 in) and 0.18 millimeters (0.0071 in).

5. The animal product of claim 1 wherein said plurality of paper strips are subjected to a sterilization technique.

6. The animal product of claim 1 wherein said plurality of paper strips include adjuvants operative to enhance performance of said puck or entertainment value of said puck for a laboratory animal.

7. The animal product of claim 6 wherein said adjuvants comprise fragrances, dyes, odor suppressants, superabsorbent polymer granules, and flavorants.

8. The animal product of claim 6 wherein said adjuvants have an irregular distribution in said puck.

9. The animal product of one of claim 1 wherein said plurality of strips comprises at least two types of strips from planar, crinkled, twisted, or rolled.

10. The animal product of one of claim 1 wherein said puck has a mean height from about 25.4 millimeters (0.1 in) to about 254 millimeters (1.0 in), and a diameter of about 127 millimeters (0.5 in) to about 508 millimeters (2.0 in).

11. The animal product of one of claim 1 wherein said puck has a diameter to height ratio from about 2:1 to about 30:1.

12. The animal product of claim 1 wherein said puck is subjected to a radiation sterilization technique.

13. A process for enriching a laboratory animal in a cage comprising:
providing the animal with a puck according to claim 1; and
allowing the animal to disassemble said puck.

14. The process of claim 13 wherein the animal is a mouse.

15. The process of claim 14 wherein said adjuvants comprise fragrances, dyes, odor suppressants, superabsorbent polymer granules, and flavorants.

16. The process of claim 14 wherein said adjuvants have an irregular distribution in said puck.

17. The process of claim 14 wherein adjuvant is applied in the form of a solid, liquid, or solution with excess moisture being removed from said paper strips.

18. The process of claim 13 further comprising adding adjuvants operative to enhance performance and entertainment value of said puck.

19. The process of claim 13 wherein said plurality of paper strips are subjected to sterilization prior to providing said puck to said animal.

20. The process of claim 13 wherein the size of said puck provided is determined by the size and type of animal.

21. An animal product, said product comprising:
a plurality of paper strips, said plurality of paper strips having a thickness between 0.07 millimeters (0.0028 in) and 0.18 millimeters (0.0071 in);
a puck formed from the compression of said plurality of paper strips in a mold; and
wherein said puck induces extended play time in a laboratory animal by providing the animal the opportunity to relocate and disassemble said puck into said plurality of paper strips.

22. The animal product of claim 21 wherein said plurality of paper strips comprise at least one ply of fibrous material.

23. The animal product of claim 22 wherein said fibrous material includes cellulose, alkoxylated cellulose, alginate, starch, polyethylene, polypropylene, polyvinyl, polystyrene, Spandex, Lycra, rubber, fleece, cellulose pulp, cellulose derivatives, or any combinations thereof.

24. The animal product of claim 21 wherein said plurality of paper strips having a height to length ratio from about 1:1 to about 1:200.

25. The animal product of claim 21 wherein said plurality of paper strips are subjected to a sterilization technique.

26. The animal product of claim 21 wherein said plurality of paper strips include adjuvants operative to enhance performance of said puck or entertainment value of said puck for a laboratory animal.

27. The animal product of claim 26 wherein said adjuvants comprise fragrances, dyes, odor suppressants, superabsorbent polymer granules, and flavorants.

28. The animal product of claim 26 wherein said adjuvants have an irregular distribution in said puck.

29. The animal product of claim 21 wherein said plurality of strips comprises at least two types of strips from planar, crinkled, twisted, or rolled.

30. The animal product of claim 21 wherein said puck has a mean height from about 25.4 millimeters (0.1 in) to about 254 millimeters (1.0 in), and a diameter of about 127 millimeters (0.5 in) to about 508 millimeters (2.0 in).

31. The animal product of claim 21 wherein said puck has a diameter to height ratio from about 2:1 to about 30:1.

32. The animal product of claim 21 wherein said puck is subjected to a radiation sterilization technique.

33. An animal product, said product comprising:
a plurality of paper strips;
a puck formed from the compression of said plurality of paper strips in a mold, said plurality of paper strips being subjected to a sterilization technique before or after said puck is formed therefrom; and
wherein said puck induces extended play time in a laboratory animal by providing the animal the opportunity to relocate and disassemble said puck into said plurality of paper strips.

34. The animal product of claim 33 wherein said plurality of paper strips comprise at least one ply of fibrous material.

35. The animal product of claim 34 wherein said fibrous material includes cellulose, alkoxylated cellulose, alginate, starch, polyethylene, polypropylene, polyvinyl, polystyrene, Spandex, Lycra, rubber, fleece, cellulose pulp, cellulose derivatives, or any combinations thereof.

36. The animal product of claim 33 wherein said plurality of paper strips having a height to length ratio from about 1:1 to about 1:200.

37. The animal product of claim 33 wherein said plurality of paper strips having a thickness between 0.07 millimeters (0.0028 in) and 0.18 millimeters (0.0071 in).

38. The animal product of claim 33 wherein said plurality of paper strips include adjuvants operative to enhance performance of said puck or entertainment value of said puck for a laboratory animal.

39. The animal product of claim 38 wherein said adjuvants comprise fragrances, dyes, odor suppressants, superabsorbent polymer granules, and flavorants.

40. The animal product of claim 38 wherein said adjuvants have an irregular distribution in said puck.

41. The animal product of claim 33 wherein said plurality of strips comprises at least two types of strips from planar, crinkled, twisted, or rolled.

42. The animal product of claim 33 wherein said puck has a mean height from about 25.4 millimeters (0.1 in) to about 254 millimeters (1.0 in), and a diameter of about 127 millimeters (0.5 in) to about 508 millimeters (2.0 in).

43. The animal product of claim 33 wherein said puck has a diameter to height ratio from about 2:1 to about 30:1.

44. An animal product, said product comprising:
a plurality of paper strips, said plurality of paper strips including adjuvants operative to enhance performance of said puck or entertainment value of said pick for a laboratory animal, wherein said adjuvants comprise fragrances, dyes, odor suppressants, superabsorbent polymer granules, and flavorants;
a puck formed from the compression of said plurality of paper strips in a mold; and
wherein said puck induces extended play time in a laboratory animal by providing the animal the opportunity to relocate and disassemble said puck into said plurality of paper strips.

45. The animal product of claim 44 wherein said plurality of paper strips comprise at least one ply of fibrous material.

46. The animal product of claim 44 wherein said fibrous material includes cellulose, alkoxylated cellulose, alginate, starch, polyethylene, polypropylene, polyvinyl, polystyrene, Spandex, Lycra, rubber, fleece, cellulose pulp, cellulose derivatives, or any combinations thereof.

47. The animal product of claim 44 wherein said plurality of paper strips having a height to length ratio from about 1:1 to about 1:200.

48. The animal product of claim 44 wherein said plurality of paper strips are subjected to a sterilization technique.

49. The animal product of claim 44 wherein said plurality of paper strips include adjuvants operative to enhance performance of said puck or entertainment value of said puck for a laboratory animal.

50. The animal product of claim 49 wherein said adjuvants have an irregular distribution in said puck.

51. The animal product of claim 44 wherein said plurality of paper strips having a thickness between 0.07 millimeters (0.0028 in) and 0.18 millimeters (0.0071 in).

52. The animal product of claim 44 wherein said plurality of strips comprises at least two types of strips from planar, crinkled, twisted, or rolled.

53. The animal product of claim 44 wherein said puck has a mean height from about 25.4 millimeters (0.1 in) to about 254 millimeters (1.0 in), and a diameter of about 127 millimeters (0.5 in) to about 508 millimeters (2.0 in).

54. The animal product of claim 44 wherein said puck has a diameter to height ratio from about 2:1 to about 30:1.

55. The animal product of claim 44 wherein said puck is subjected to radiation sterilization.

56. An animal product, said product comprising:
a plurality of paper strips, said plurality of paper strips comprising at least two types of strips from planar, crinkled, twisted, or rolled;
a puck formed from the compression of said plurality of paper strips in a mold; and
wherein said puck induces extended play time in a laboratory animal by providing the animal the opportunity to relocate and disassemble said puck into said plurality of paper strips.

57. An animal product, said product comprising:
a plurality of paper strips;
a puck formed from the compression of said plurality of paper strips in a mold, wherein said puck is subject to a radiation sterilization technique; and
wherein said puck induces extended play time in a laboratory animal by providing the animal the opportunity to relocate and disassemble said puck into said plurality of paper strips.

58. The animal product of claim 57 wherein said plurality of paper strips comprise at least one ply of fibrous material.

59. The animal product of claim 57 wherein said fibrous material includes cellulose, alkoxylated cellulose, alginate, starch, polyethylene, polypropylene, polyvinyl, polystyrene, Spandex, Lycra, rubber, fleece, cellulose pulp, cellulose derivatives, or any combinations thereof.

60. The animal product of claim 57 wherein said plurality of paper strips having a height to length ratio from about 1:1 to about 1:200.

61. The animal product of claim 57 wherein said plurality of paper strips having a thickness between 0.07 millimeters (0.0028 in) and 0.18 millimeters (0.0071 in).

62. The animal product of claim 57 wherein said plurality of paper strips include adjuvants operative to enhance performance of said puck or entertainment value of said puck for a laboratory animal.

63. The animal product of claim 62 wherein said adjuvants comprise fragrances, dyes, odor suppressants, superabsorbent polymer granules, and flavorants.

64. The animal product of claim 62 wherein said adjuvants have an irregular distribution in said puck.

65. The animal product of claim 57 wherein said plurality of strips comprises at least two types of strips from planar, crinkled, twisted, or rolled.

66. The animal product of claim 57 wherein said puck has a mean height from about 25.4 millimeters (0.1 in) to about 254 millimeters (1.0 in), and a diameter of about 127 millimeters (0.5 in) to about 508 millimeters (2.0 in).

67. The animal product of claim 57 wherein said puck has a diameter to height ratio from about 2:1 to about 30:1.

68. A process for enriching a laboratory animal in a cage comprising:
 providing the animal with a puck comprising:
  a plurality of paper strips; and a product formed from the compression of said plurality of paper strips in a mold;
  adding adjuvants operative to enhance performance and entertainment value of said puck, wherein said adjuvants have an irregular distribution in said puck; and
 allowing the animal to disassemble said puck.

69. A process for enriching a laboratory animal in a cage comprising:
 providing the animal with a product comprising:
  a plurality of paper strips; and a puck formed from the compression of said plurality of paper strips in a mold, wherein said plurality of paper strips are subjected to a sterilization technique prior to providing said puck to said animal; and
 allowing the animal to disassemble said puck.

* * * * *